United States Patent
Ketels et al.

(10) Patent No.: US 12,120,416 B2
(45) Date of Patent: Oct. 15, 2024

(54) TECHNOLOGIES FOR GESTURE CONTROL OF CAMERA VIEW SELECTION FOR VEHICLE COMPUTING DEVICES

(71) Applicant: Clarion Corporation of America, Auburn Hills, MI (US)

(72) Inventors: Cédric Ketels, Auburn Hills, MI (US); Thomas Dessapt, Auburn Hills, MI (US)

(73) Assignee: Clarion Corporation of America, Auburn Hills, MI (US)

( * ) Notice: Subject to any disclaimer, the term of this patent is extended or adjusted under 35 U.S.C. 154(b) by 193 days.

(21) Appl. No.: 17/897,335

(22) Filed: Aug. 29, 2022

(65) Prior Publication Data

US 2024/0073510 A1 Feb. 29, 2024

(51) Int. Cl.
*H04N 23/62* (2023.01)
*G06F 3/01* (2006.01)
*H04N 23/63* (2023.01)

(52) U.S. Cl.
CPC ............ *H04N 23/62* (2023.01); *G06F 3/017* (2013.01); *H04N 23/631* (2023.01)

(58) Field of Classification Search
CPC ...... H04N 23/62; H04N 23/631; H04N 7/181; G06F 3/017; G06F 3/04845; G06F 3/04883; B60R 2300/105; B60R 2300/308; B60R 2300/70; B60R 1/23; B60K 35/00
See application file for complete search history.

(56) References Cited

U.S. PATENT DOCUMENTS

| 6,697,105 B1 * | 2/2004 | Kato | H04N 23/631 |
| | | | 348/E7.086 |
| 8,665,331 B2 | 3/2014 | Onaka | |
| 9,195,390 B2 | 11/2015 | Wu | |
| 10,479,275 B2 | 11/2019 | Miyoshi | |
| 2015/0287326 A1 * | 10/2015 | Weller | B60R 25/102 |
| | | | 348/148 |
| 2021/0370773 A1 * | 12/2021 | Oba | G06V 20/597 |

FOREIGN PATENT DOCUMENTS

| CN | 113212304 | 8/2021 |
| JP | 4973564 | 7/2012 |

OTHER PUBLICATIONS

Axis Communications AB, "Axis Camera Station User's Manual", Apr. 2005, retrieved from https://www.axis.com/ftp/pub_soft/cam_srv/cam_station_old/1_20/Users_Manual/Users_Manual.pdf on May 4, 2024 (Year: 2005).*

* cited by examiner

*Primary Examiner* — Timothy J Henn
(74) *Attorney, Agent, or Firm* — Barnes & Thornburg LLP

(57) ABSTRACT

The present disclosure relates to gestural control of a computing device coupled to a vehicle.

11 Claims, 6 Drawing Sheets

TECHNOLOGIES FOR GESTURE CONTROL OF CAMERA VIEW SELECTION FOR VEHICLE COMPUTING DEVICES

BACKGROUND

The present disclosure relates to human-machine interaction techniques. More particularly, the present disclosure relates to gesture-based human-machine interaction techniques for in-vehicle computing devices.

SUMMARY

According to the present disclosure, a computing device for human machine interaction comprises an external view manager, a display manager, a user interface manager, and an eternal view controller. The external view manager is to (i) receive image data from one or more camera devices coupled to a vehicle and (ii) provide a plurality of camera loops, wherein each camera loop is associated with a plurality of camera views arranged in a circular ordering. Each camera view is based on the image data, and wherein each camera loop is further associated with a vertical viewing angle relative to the vehicle. The display manager is to display an active camera view based an active camera view selection. The active camera view selection is indicative of an active camera loop of the plurality of camera loops and the active camera view. The active camera view is selected from the plurality of camera views associated with the active camera loop. The user interface manager is to receive a gestural input from a user of the computing device, and the external view controller is to update the active camera view selection based on the gestural input. To update the active camera view selection comprises to select the active camera loop from the plurality of camera loops or to select the active camera view from the plurality of camera views associated with the active camera loop.

In illustrative embodiments, to receive the gestural input comprises to receive touch input from a touch screen of the computing device.

In illustrative embodiments, to update the active camera view selection based on the gestural input comprises to determine whether a selected direction of the gestural input comprises a vertical direction or a horizontal direction; select the active camera view from the plurality of camera views associated with the active camera loop in response to a determination that the selected direction of the gestural input comprises the horizontal direction; and select the active camera loop from the plurality of camera loops in response to a determination that the selected direction of the gestural input comprises the vertical direction.

In illustrative embodiments, to select the active camera view from the plurality of camera views associated with the active camera loop comprises to select a camera view adjacent to the active camera view in the circular ordering of the plurality of camera views. In illustrative embodiments, to select the camera view adjacent to the active camera view comprises to determine a horizontal direction of the gestural input and select the camera view adjacent to the active camera view in the horizontal direction of the gestural input relative to the vehicle.

In illustrative embodiments, wherein to select the active camera loop from the plurality of camera loops comprises to select a camera loop adjacent to the active camera loop, wherein the plurality of camera loops are ordered by vertical viewing angle relative to the vehicle. In illustrative embodiments, to select the camera loop adjacent to the active camera loop comprises to determine a vertical direction of the gestural input and select the camera loop adjacent to the active camera loop in the vertical direction of the gestural input relative to the vehicle.

In illustrative embodiments, the display manager is further to display an indication of the active camera view that is indicative of a view angle of the active camera view relative to the vehicle. In illustrative embodiments, the indication of the active camera view comprises a plurality of icons, wherein each icon is associated with a camera view of the plurality of camera views associated with the active camera loop, and wherein each of the plurality of icons has a position indicative of a view angle of the associated camera view relative to the vehicle. In illustrative embodiments, the display manager is further to display an indication of the active camera loop within a list of the plurality of camera loops.

According to another aspect of the present disclosure, a method for human machine interaction comprises receiving, by a computing device, image data from one or more camera devices coupled to a vehicle; providing, by the computing device, a plurality of camera loops, wherein each camera loop is associated with a plurality of camera views arranged in a circular ordering, wherein each camera view is based on the image data, and wherein each camera loop is further associated with a vertical viewing angle relative to the vehicle; displaying, by the computing device, an active camera view based an active camera view selection, wherein the active camera view selection is indicative of an active camera loop of the plurality of camera loops and the active camera view, wherein the active camera view is selected from the plurality of camera views associated with the active camera loop; receiving, by the computing device, a gestural input from a user of the computing device; and updating, by the computing device, the active camera view selection based on the gestural input, wherein updating the active camera view selection comprises selecting the active camera loop from the plurality of camera loops or selecting the active camera view from the plurality of camera views associated with the active camera loop.

In illustrative embodiments, receiving the gestural input comprises receiving touch input from a touch screen of the computing device.

In illustrative embodiments, updating the active camera view selection based on the gestural input comprises determining whether a selected direction of the gestural input comprises a vertical direction or a horizontal direction; selecting the active camera view from the plurality of camera views associated with the active camera loop in response to determining that the selected direction of the gestural input comprises the horizontal direction; and selecting the active camera loop from the plurality of camera loops in response to determining that the selected direction of the gestural input comprises the vertical direction.

In illustrative embodiments, selecting the active camera view from the plurality of camera views associated with the active camera loop comprises selecting a camera view adjacent to the active camera view in the circular ordering of the plurality of camera views. In illustrative embodiments, selecting the camera view adjacent to the active camera view comprises determining a horizontal direction of the gestural input and selecting the camera view adjacent to the active camera view in the horizontal direction of the gestural input relative to the vehicle.

In illustrative embodiments, selecting the active camera loop from the plurality of camera loops comprises selecting a camera loop adjacent to the active camera loop, wherein the plurality of camera loops are ordered by vertical viewing angle relative to the vehicle. In illustrative embodiments, selecting the camera loop adjacent to the active camera loop comprises determining a vertical direction of the gestural input and selecting the camera loop adjacent to the active camera loop in the vertical direction of the gestural input relative to the vehicle.

In illustrative embodiments, the method further comprises displaying, by the computing device, an indication of the active camera view that is indicative of a view angle of the active camera view relative to the vehicle. In illustrative embodiments, displaying the indication of the active camera view comprises displaying a plurality of icons, wherein each icon is associated with a camera view of the plurality of camera views associated with the active camera loop, and wherein each of the plurality of icons has a position indicative of a view angle of the associated camera view relative to the vehicle. In illustrative embodiments, the method further comprises displaying, by the computing device, an indication of the active camera loop within a list of the plurality of camera loops.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Vehicles are including an increasing number of cameras that are capable of generating external views of the surroundings of the vehicle. As the number of available camera views increase, the controls required for selecting camera views tend to increase in number and/or complexity. For example, certain vehicles may provide an individual button (e.g., a physical button or a touchscreen button) for each available camera view. As another example, certain vehicles may organize camera view buttons into a complicated hierarchical menu structure. Those systems may be difficult to use and/or may not scale to large numbers of available camera views.

Figure 1:
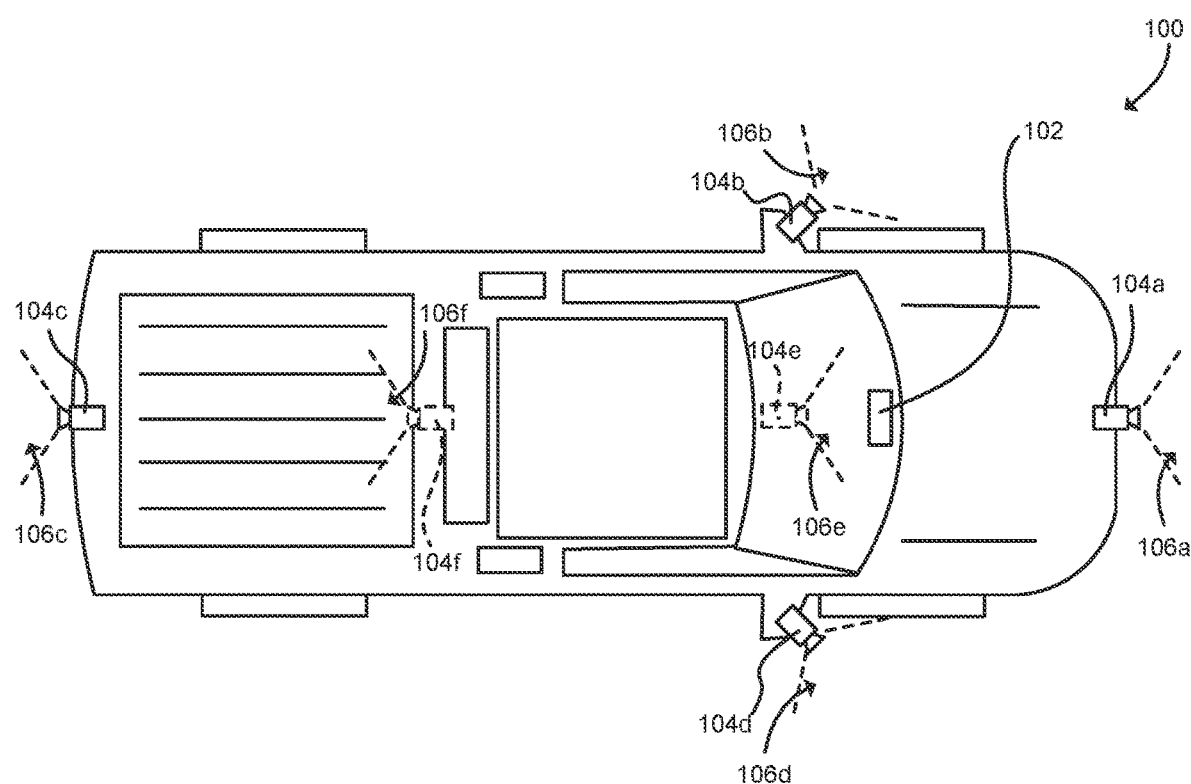
FIG. 1 is a schematic diagram of at least one embodiment of a vehicle including a computing device and multiple cameras in accordance with the present disclosure.
Figure 2:
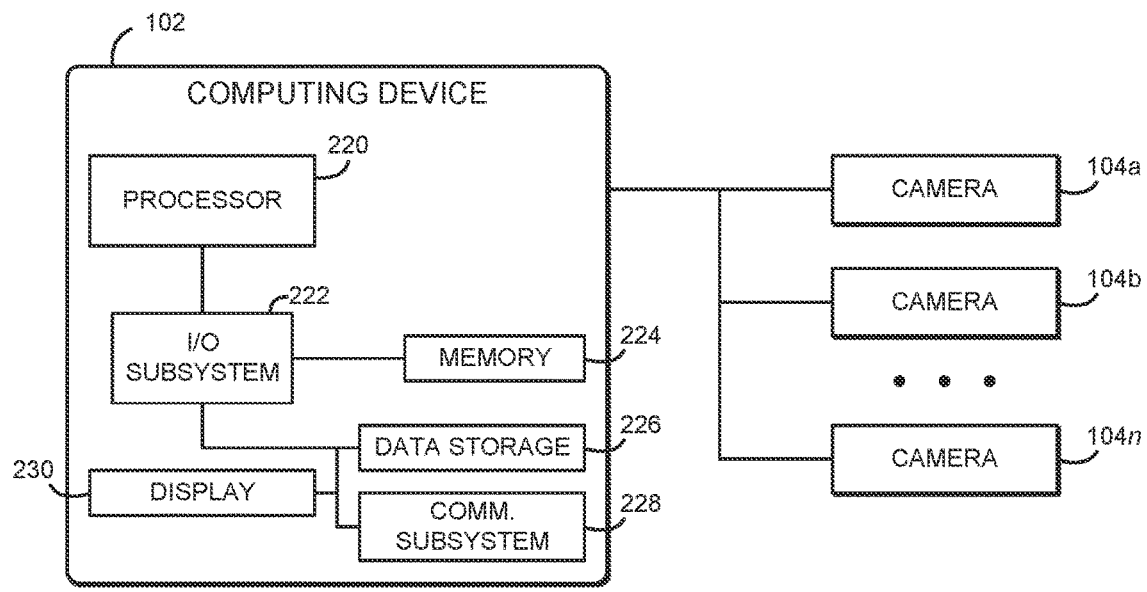
FIG. 2 is a simplified block diagram of at least one embodiment of the computing device and cameras of FIG. 1.

Referring now to FIGS. 1 and 2, an illustrative vehicle 100 in accordance with the present disclosure includes a computing device 102 coupled to multiple cameras 104. The vehicle 100 is illustratively a light truck; however, in other embodiments the vehicle 100 may be a passenger car, a van, a sport utility vehicle, a heavy truck, a trailer, or any other suitable vehicle. The computing device 102 is illustratively an in-vehicle infotainment device that provides a user interface for interacting with multiple systems of the vehicle 100, including the cameras 104. In use, as described further below, the computing device 102 may display external views relative to the vehicle 100 using image data captured by one or more of the cameras 104. The driver or other user of the vehicle 100 may use touch gesture inputs to select among multiple available camera views. As described further below, compared to traditional interaction systems, such touch gesture inputs may reduce the number of required interaction steps, avoid complex menu navigation, and reduce cognitive load on the driver. By providing simplified camera view navigation and control and reducing cognitive load, the present disclosure may thus improve ease of use of the vehicle and increase vehicle safety.

As described above, the computing device 102 is configured to provide touch control for the cameras 104. The computing device 102 may be integrated with the vehicle 100, for example during manufacturing, and/or may be an aftermarket device added to the vehicle 100. Accordingly, the computing device 102 may be embodied as any type of device capable of performing the functions described herein. For example, the computing device 102 may be embodied as, without limitation, an in-vehicle infotainment device, a vehicle computer, an embedded controller, an ECU, a tablet computer, a smartphone, a laptop computer, a consumer electronic device, a distributed computing system, a multi-processor system, and/or any other computing device capable of performing the functions described herein. As shown in FIG. 2, the illustrative computing device 102 includes a processor 220, an I/O subsystem 222, memory 224, a data storage device 226, and a communication subsystem 228. Of course, the computing device 102 may include other or additional components, such as those commonly found in a vehicle computer (e.g., various input/output devices), in other embodiments. Additionally, in some embodiments, one or more of the illustrative components may be incorporated in, or otherwise form a portion of, another component. For example, the memory 224, or portions thereof, may be incorporated in the processor 220 in some embodiments.

The processor 220 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 224 may be embodied as any type of volatile or non-volatile memory or data storage capable of performing the functions described herein. In operation, the memory 224 may store various data and software used during operation of the computing device 102 such as operating systems, applications, programs, libraries, and drivers. The memory 224 is communicatively coupled to the processor 220 via the I/O subsystem 222, which may be embodied as circuitry and/or components to facilitate input/output operations with the processor 220, the memory 224, and other components of the computing device 102. For example, the I/O subsystem 222 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 222 may form a portion of a system-on-a-chip (SoC) and be incorporated, along with the processor 220, the memory 224, and other components of the computing device 102, on a single integrated circuit chip.

The data storage device 226 may be embodied as any type of device or devices configured for short-term or long-term storage of data such as, for example, memory devices and circuits, memory cards, hard disk drives, solid-state drives, or other data storage devices. The communication subsystem 228 of the computing device 102 may be embodied as any communication circuit, device, or collection thereof, capable of enabling communications between the computing device 102, the cameras 104, and/or other devices. The communication subsystem 228 may be configured to use any one or more communication technology (e.g., wireless or wired communications) and associated protocols (e.g., Ethernet, Controller Area Network (CAN), Bluetooth®, Bluetooth Low Energy (BLE), Wi-Fi®, WiMAX, 3G LTE, 5G, etc.) to effect such communication.

As shown in FIG. 2, the computing device 102 includes or is otherwise coupled to a display 230. The display 230 may be embodied as any type of display capable of displaying digital images or other information, such as a liquid crystal display (LCD), a light emitting diode (LED), a plasma display, a cathode ray tube (CRT), or other type of display device. As described further below, the display 230 is coupled to a touch screen to allow user interaction with the computing device 102. In the illustrative embodiment, the display 230 is integrated into the dashboard of the vehicle 100. In other embodiments, the display 230 may be incorporated into other parts of the vehicle 100 and/or may be an aftermarket device coupled to the vehicle 100.

Each camera 104 may be embodied as a digital camera or other digital imaging device coupled to the vehicle 100 and communicatively coupled to the computing device 102. Each camera 104 includes an electronic image sensor, such as an active-pixel sensor (APS), e.g., a complementary metal-oxide-semiconductor (CMOS) sensor, or a charge-coupled device (CCD). Each camera 104 may be used to capture image data including, in some embodiments, capturing still images or video images of the surroundings of the vehicle 100.

As shown in FIG. 1, the illustrative vehicle 100 includes six cameras 104 labeled cameras 104a through 104f. Cameras 104a through 104d are arranged roughly around the midline of the vehicle 100, specifically on the hood, the mirrors, and the tailgate of the vehicle 100. Cameras 104e, 104f are positioned on the undercarriage of the vehicle 100. Each camera 104 captures image data from a corresponding field of view 106. Thus, the cameras 104a through 104d capture image data from the fields of view 106a through 106d respectively, representing views from roughly around the midline of the vehicle 100. Cameras 104e, 104f capture image data from the fields of view 106e, 106f respectively, representing views of underneath the vehicle 100. As described further below, the computing device 102 may display camera views on the display 230 based on the image data received from the cameras 104. Each camera view may be generated based on the field of view 106 of a single camera 104 (e.g., a camera view of straight ahead corresponding to the view 106a from the camera 104a, a camera view of straight behind corresponding to the view 106c from the camera 104c, or other camera view), or in some embodiments may be stitched together or otherwise generated from image data representing multiple fields of view 106 generated by multiple cameras 104 (e.g., a rear three-quarters elevated view based on image data received from the cameras 104b, 104c, 104d, or other synthetic or generated view). Although illustrated as including six cameras 104, it should be understood that in other embodiments the vehicle 100 may include a different number and/or arrangement of cameras 104.

Figure 3:
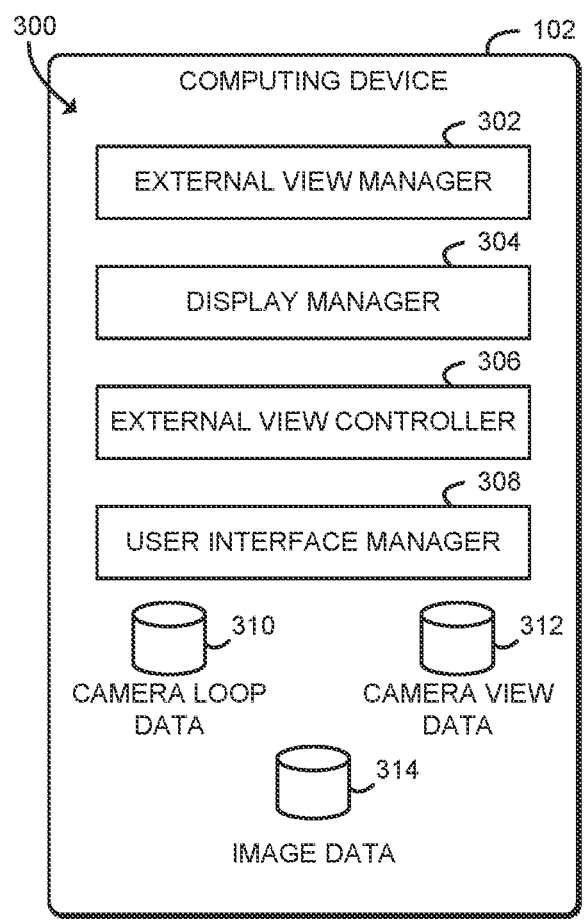
FIG. 3 is a simplified block diagram of at least one embodiment of an environment that may be established by the computing device of FIGS. 1 and 2.

Referring now to FIG. 3, in the illustrative embodiment, the computing device 102 establishes an environment 300 during operation. The illustrative environment 300 includes an external view manager 302, a display manager 304, an external view controller 306, and a user interface manager 308. The various components of the environment 300 may be embodied as hardware, firmware, software, or a combination thereof. As such, in some embodiments, one or more of the components of the environment 300 may be embodied as circuitry or a collection of electrical devices (e.g., external view manager circuitry 302, display manager circuitry 304, external view controller circuitry 306, and/or user interface manager circuitry 308). It should be appreciated that, in such embodiments, one or more of those components may form a portion of the processor 220, the memory 224, the data storage 226, the display 230, and/or other components of the computing device 102.

The external view manager 302 is configured to receive image data 314 from one or more camera devices 104 coupled to the vehicle 100. The external view manager 302 is further configured to provide a plurality of camera loops, which may be stored in camera loop data 310. Each camera loop is associated with a plurality of camera views arranged in a circular ordering, which may be stored in camera view data 312. Each camera view is based on the image data 314. Each camera loop is further associated with a vertical viewing angle relative to the vehicle 100.

The display manager 304 is configured to display an active camera view based an active camera view selection. The active camera view selection is indicative of an active camera loop of the plurality of camera loops and the active camera view. The active camera view is selected from the plurality of camera views associated with the active camera loop. In some embodiments, the display manager 304 is further configured to display an indication of an active camera view that is indicative of a view angle of the active camera view relative to the vehicle 100. The indication of the active camera view may include a plurality of icons, wherein each icon is associated with a camera view of the plurality of camera views associated with the active camera loop. Each of the plurality of icons has a position indicative of a view angle of the associated camera view relative to the vehicle. In some embodiments, the display manager 304 is further configured to display an indication of the active camera loop within a list of the plurality of camera loops.

The user interface manager 308 is configured to receive a gestural input from a user of the computing device 102. The gestural input may be received as touch input from a touch screen of the computing device 102, such as a touch screen coupled to the display 230. In some embodiments, the gestural input may be received as gesture tracking input from a sensor of the computing device 102, such as a camera or a proximity sensor.

The external view controller 306 is configured to update the active camera view selection based on the gestural input. Updating the active camera view selection includes selecting the active camera loop from the plurality of camera loops or selecting the active camera view from the plurality of camera views associated with the active camera loop. Update the active camera view selection based on the gestural input may include determining whether a selected direction of the gestural input is a vertical direction or a horizontal direction, selecting the active camera view from the plurality of camera views if the selected direction is the horizontal direction, and selecting the active camera loop from the plurality of camera loops if the selected direction is the vertical direction. Selecting the active camera view from the plurality of camera views associated with the active camera loop may include selecting a camera view adjacent to the active camera view in the circular ordering of the plurality of camera views, which may include determining a horizontal direction of the gestural input and selecting the camera view adjacent to the active camera view in the horizontal direction of the gestural input relative to the vehicle 100. Selecting the active camera loop from the plurality of camera loops may include selecting a camera loop adjacent to the active camera loop, where the plurality of camera loops are ordered by vertical viewing angle relative to the vehicle 100. Selecting the adjacent camera loop may include determining a vertical direction of the gestural input and selecting the camera loop adjacent to the active camera loop in the vertical direction of the gestural input relative to the vehicle 100.

Figure 4:
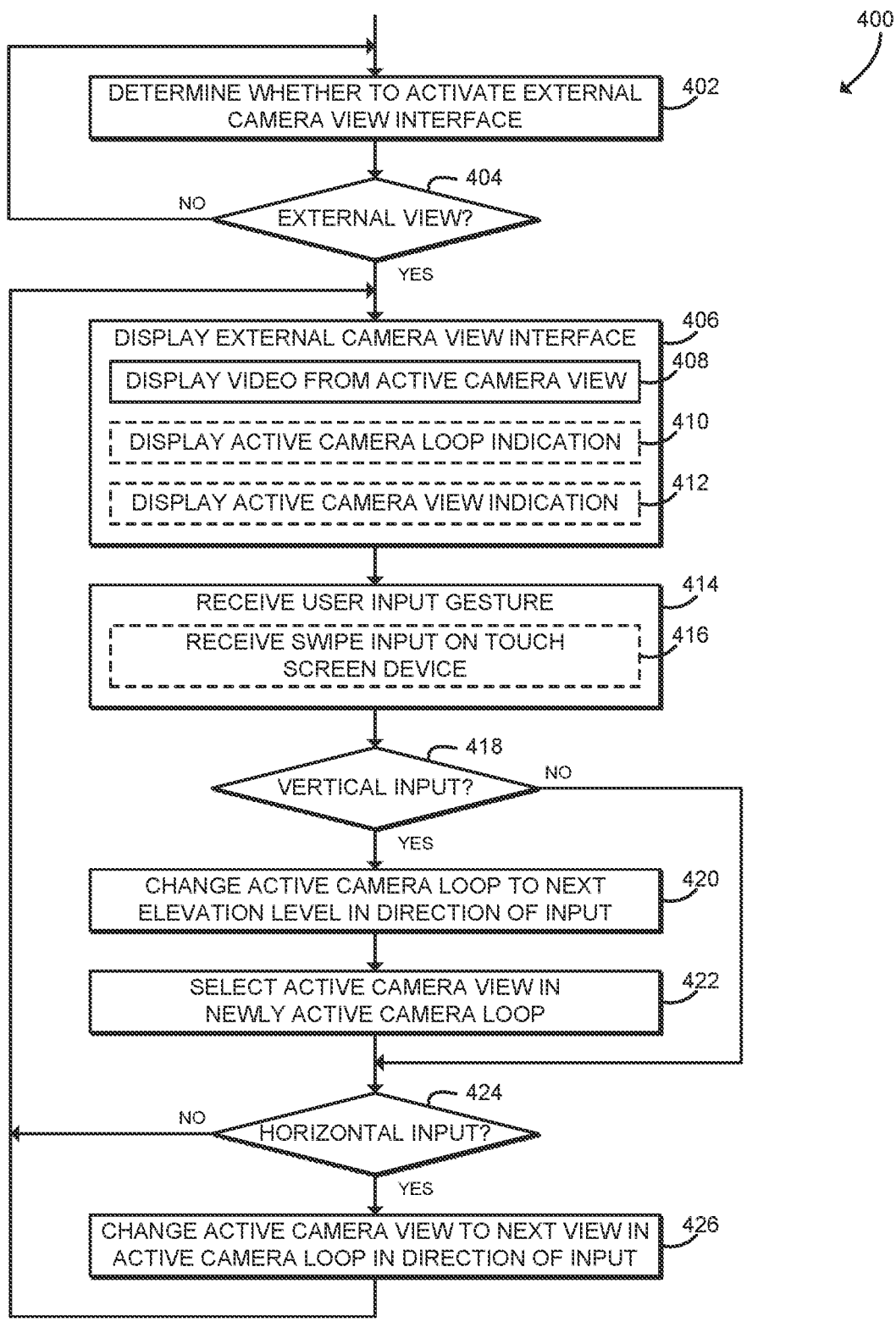
FIG. 4 is a simplified flow diagram of at least one embodiment of a method for human-machine interaction that may be executed by the computing device of FIGS. 1-3.

Referring now to FIG. 4, in use, the computing device 102 may execute a method 400 for human-machine interaction. It should be appreciated that, in some embodiments, the operations of the method 400 may be performed by one or more components of the environment 300 of the computing device 102 as shown in FIG. 3. The method 400 begins with block 402, in which the computing device 102 determines whether to activate an external camera view interface. The computing device 102 may activate the external camera view interface, for example, in response to a user command received through a touch screen interface or other interface of the vehicle 100. As another example, the computing device 102 may activate the external camera view interface in response to a vehicle event such as the vehicle 100 changing into reverse gear, activating an off-roading mode, or other vehicle event. In block 404, the computing device 102 checks whether to activate the external camera view interface. If not, the method 400 loops back to block 402 to continue checking whether to activate the external camera view interface. If the computing device 102 determines to activate the external camera view interface, the method 400 advances to block 406.

In block 406, the computing device 102 displays the external camera view interface. The computing device 102 may display the interface on the display 230 or other display coupled to the computing device 102. As described further below, the external camera view interface includes video or other image data for a currently active camera view as well as a gesture area to receive user input gestures. In block 408, the computing device 102 displays video data for an active camera view. As described above, the active camera view may represent the field of view 106 and/or part of the field of view 106 associated with a particular camera 104. Additionally or alternatively, the active camera view may be generated from image data received from multiple cameras 104. For example, the active camera view may be generated by stitching together image data from multiple cameras 104 or otherwise combining the image data. In some embodiments, the active camera view may include additional data, such as a 3D rendering representing the vehicle 100, overlay information, or other graphical data.

In some embodiments, in block 410 the computing device 102 may display an active camera loop indication. As discussed above, the computing device 102 may support or otherwise provide multiple available camera views. Those available camera views are organized into camera loops. Each camera loop includes multiple camera views each having roughly the same vertical viewing angle and/or altitude relative to the vehicle 100. For example, in an embodiment, the computing device 102 may provide four camera loops. Those camera loops may be associated with an under-vehicle viewing angle, a vehicle midline viewing angle, a three-quarters above vehicle viewing angle, and an overhead viewing angle. In some embodiments, one or more camera loops may have a similar altitude or elevation relative to the vehicle 100, but a different vertical viewing angle. For example, the three-quarters above vehicle viewing angle may have a view position from above the vehicle 100 with a downward angle of about 45 degrees, and the overhead viewing angle may have a view position from above the vehicle 100 at about the same elevation but at a downward angle of about 90 degrees. The active camera loop indication may indicate on the display 230 which of those camera loops is associated with the currently active camera view.

In some embodiments, in block 412 the computing device 102 may display an active camera view indication. The active camera view indication may indicate on the display 230 which of the camera views of the active camera loop is currently the active camera view and, thus, which of the camera views is currently being displayed on the display 230.

Figure 5:
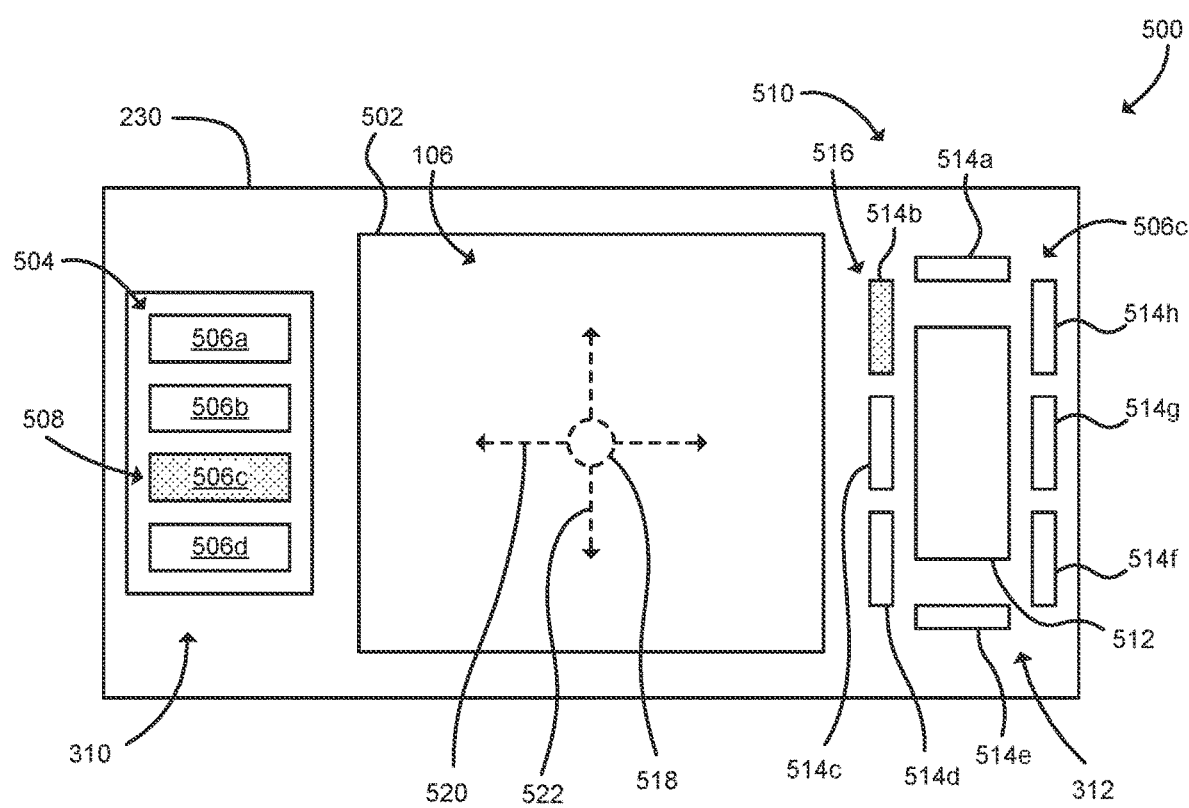
FIG. 5 is a schematic diagram illustrating at least one potential embodiment of an interface that may be established by the computing device of FIGS. 1-3.

Referring now to FIG. 5, wireframe diagram 500 illustrates one potential embodiment of the external camera view interface. As shown, the external camera view interface is shown on the display 230. Although illustrated as occupying the entire display 230, it should be understood that in some embodiments the external camera view interface may occupy only part of the display 230, and/or in some embodiments the external camera view interface may extend across multiple displays.

The illustrative external camera view interface includes an active camera view 502. The active camera view 502 illustratively shows image data corresponding with the field of view 106 of a camera 104 or, as described above, a camera view generated from multiple cameras 104.

The illustrative external camera view interface further includes a list control 504 that displays the camera loops 506 available for the vehicle 100, based on the camera loop data 310. As described above, each camera loop 506 is associated with a vertical viewing angle or altitude relative to the vehicle 100. Illustratively, the external camera view interface shows four available camera loops 506, which may be embodied as an overhead camera loop 506a, a three-quarters view camera loop 506b, a vehicle midline camera loop 506c, and an under-vehicle camera loop 506d. The interface further includes an active camera loop indicator 508, which is illustratively embodied as the highlighted camera loop 506c in the list control 504, which may corresponding to the vehicle midline viewing angle.

The illustrative external camera view interface further includes a camera loop control 510 that illustrates available camera views for the active camera loop 506 (e.g., the camera loop 506c in the illustrative embodiment), based on the camera view data 312. The camera loop control 510 includes a representation 512 of the vehicle 100 surrounded by icons 514 corresponding to the available camera views of the active camera loop 506. Illustratively, the active camera loop 506c includes eight camera views 514a through 514h. The position of each camera view icon 514 relative to the vehicle representation 512 indicates the relative view angle of the corresponding camera view. The interface further includes an active camera view indicator 516, which is illustratively embodied as the highlighted camera view icon 514b, which may correspond to a left-front fender view.

Referring back to FIG. 4, after displaying the external camera view interface, in block 414 the computing device 102 receives one or more user input gestures. In some embodiments, in block 416 the computing device 102 may receive swipe input on a touch screen device, such as the display 230. The swipe gesture input may be generated by the user running his or her finger across the touchscreen display 230 in a horizontal and/or a vertical direction. Referring again to FIG. 5, the illustrative active camera view 502 provides a touch input target 518, which supports receiving touch input gestures from the user. Illustratively, the touch input target 518 may receive horizontal swipe gestures 520, vertical swipe gestures 522, and/or other touch input gestures provided by the user. Although illustrated as accepting touch input on the active camera view 502, it should be understood that in some embodiments other parts of the display 230 and/or the entire display 230 may receive touch input from the user. Additionally or alternatively, in other embodiments the computing device 102 may receive the user input gesture using one or more input modalities other than touch input. For example, in some embodiments the computing device 102 may receive gesture tracking input from one or more cameras, proximity sensors, depth cameras, or other sensors capable of tracking motion of the user's fingers and/or hands in space. In those embodiments, the user may make an air gesture above the display 230 without touching the display 230 (or otherwise without registering touch input on the display 230).

Referring again to FIG. 4, after receiving the user input gesture, in block 418 the computing device 102 determines whether a vertical gesture input has been received. If not, the method 400 branches to block 424, described below. If a vertical gesture input is received, the method 400 advances to block 420, in which the computing device 102 changes the active camera loop to the next vertical viewing angle or altitude level in the direction of the user input. As an illustrative example, referring again to FIG. 5, if the user input is in the "up" direction, the computing device 102 may change the active camera loop from the loop 506c to the loop 506b, which has a higher vertical viewing angle and/or a higher altitude relative to the vehicle 100. Continuing that example, if the user input is in the "down" direction, the computing device 102 may change the active camera loop from the loop 506c to the loop 506d, which has a lower vertical viewing angle and/or altitude.

Referring back to FIG. 4, after changing the active camera loop, the method 400 proceeds to block 422, in which the computing device 102 selects an active camera view from the newly active camera loop. The computing device 102 may select an active camera view that has a comparable viewing angle relative to the vehicle 100 as compared to the previously active camera view of the previously active camera loop. For example, if the previously active camera view was toward the front of the vehicle 100, the computing device 102 may select a camera view in the newly active camera loop that is also toward the front of the vehicle. When the active camera loop has a different number of camera views than the previous camera loop, the computing device 102 may select a best match for the previous camera view, recall a previously selected camera view for the active camera loop, select a default camera view, or use any other appropriate criteria to select the active camera view.

In block 424, the computing device 102 determines whether a horizontal gesture input has been received. If not, the method 400 loops back to block 406 to continue displaying the external camera view interface and monitoring for user input.

If a horizontal gesture input is received, the method 400 advances to block 426, in which the computing device 102 changes the active camera view to the next camera view included in the active camera loop in the direction of the user input. As an illustrative example, referring again to FIG. 5, if the user input is in the "left" direction, the computing device 102 may change the active camera view from the view 514b to the view 514c, which has a viewing angle positioned toward the left relative to the view 514b. Continuing that example, if the user input is in the "right" direction, the computing device 102 may change the active camera view from the camera view 514b to the camera view 514a, which has a viewing angle positioned toward the right relative to the view 514b. As shown, each active camera loop is circular, and thus the active camera view may wrap around the vehicle 100 without reaching a stopping point. Referring back to FIG. 4, after changing the active camera view, the method 400 loops back to block 406 to continue displaying the external camera view interface and monitoring for user input.

Figure 6:
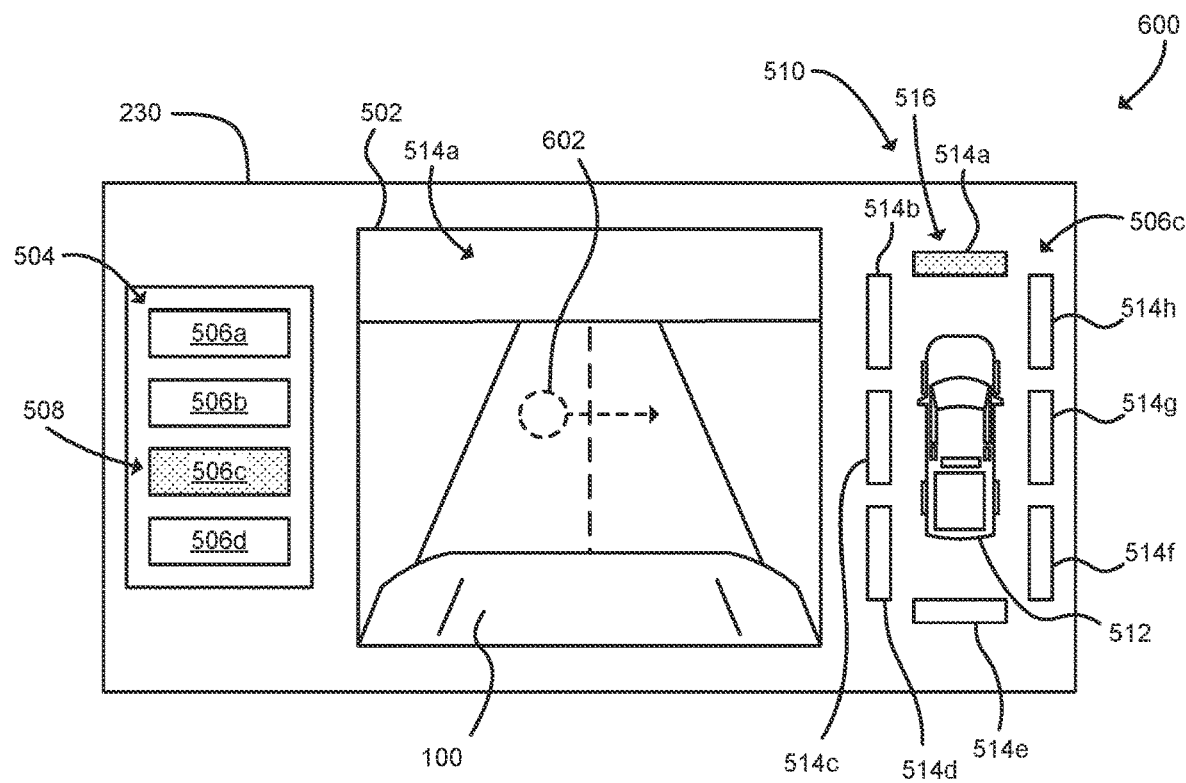
FIGS. 6-8 are schematic diagrams illustrating user interaction flow that may be performed with the interface of FIG. 5 and in accordance with the method of FIG. 4.
Figure 7:
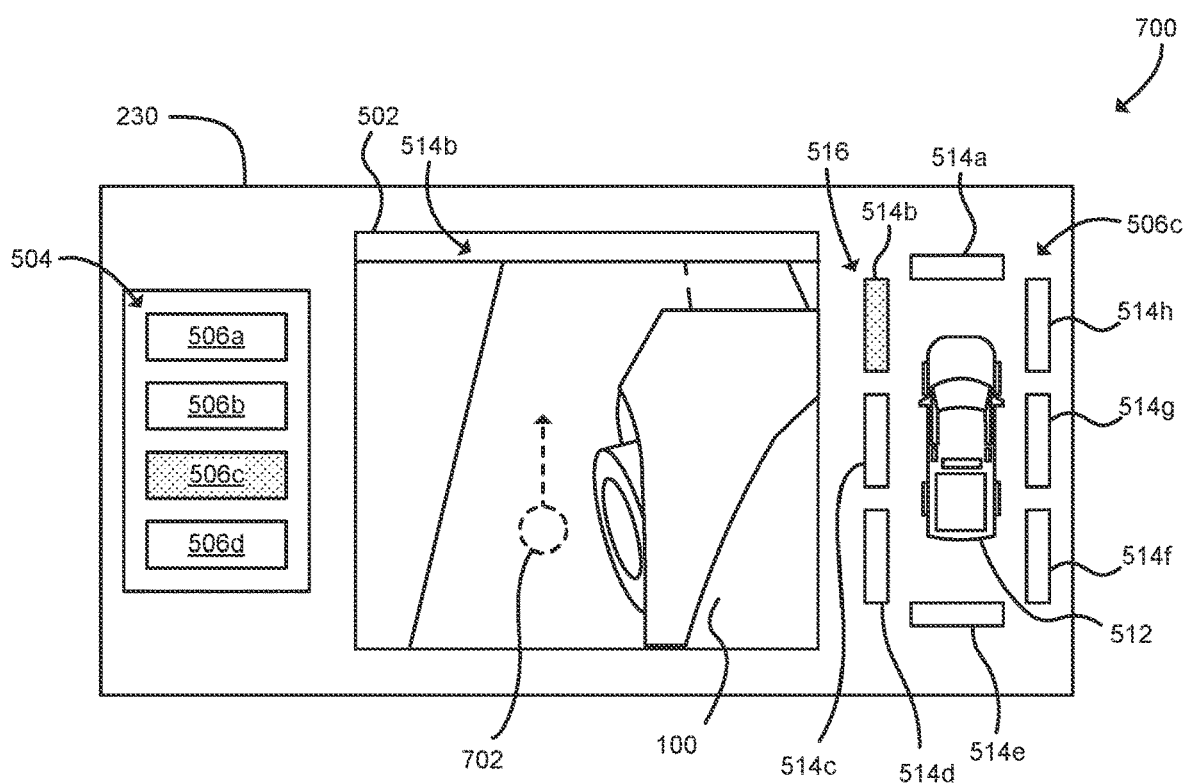
Figure 8:
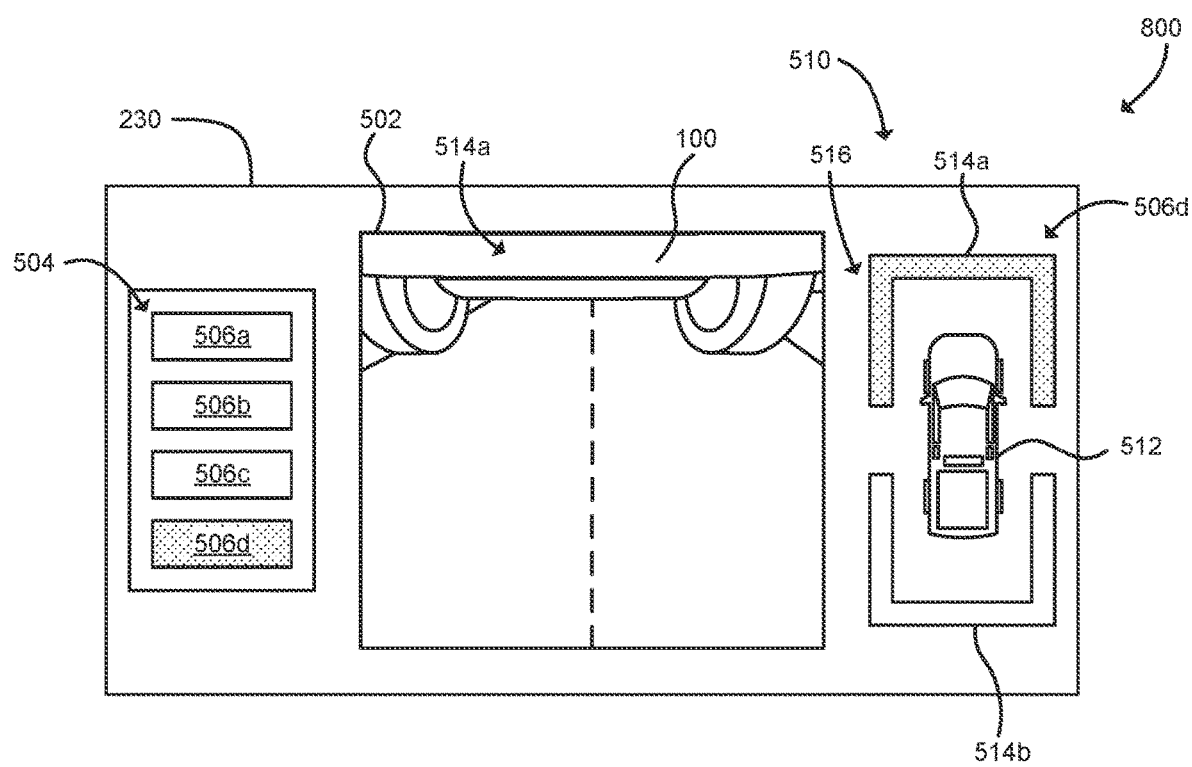

Referring now to FIGS. 6-8, an illustrative interaction sequence that may be performed using the computing device 102 is shown. As shown in FIG. 6, diagram 600 shows an illustrative embodiment of the external camera view interface that may be displayed on the display 230. As shown in the illustrative diagram 600, the camera loop 506c is the active camera loop. The camera loop control 510 represents the camera views 514 that are available in the active camera loop 506c. Illustratively, the active camera loop 506c includes eight camera views 514a through 514h, and the camera view 514a is the active camera view. The active camera view window 502 thus displays image data generated for the camera view 514a. Illustratively, the camera view 514a is a straight ahead view in the vehicle midline camera loop. Thus, visible in the camera view 514a are the surroundings of the vehicle 100 (e.g., the upcoming road and other features) as well as the hood of the vehicle 100. The available camera views 514a through 514h may be generated from image data generated by the cameras 104a through 104d of FIG. 1. In the illustrative embodiment, the camera view 514a is generated from image data generated by the camera 104a. Accordingly, the hood of the vehicle 100 shown in the active camera view 502 is included in image data received from the camera 104a.

In use, the user may input a touch gesture 602 on the display 230, which is illustratively a "left" swipe. As shown, to generate the gesture 602, the user's finger initially touches toward the left of the display 230 and is drawn rightward toward the right of the display 230. The computing device 102 interprets this gesture 602 as a "left" swipe (i.e., "natural" scrolling). Of course, it should be understood that in other embodiments the sense of the gesture input 602 (e.g., which direction is considered "left" or "right") may be reversed or otherwise determined according to one or more user input conventions associated with the computing device 102. After receiving and interpreting the "left" swipe 602, the computing device 102 may update the external camera view interface as shown in diagram 700 of FIG. 7.

As shown in FIG. 7, after interpreting the "left" swipe, the camera loop 506c remains the active camera loop, and the camera view 514b is now the active camera view and is displayed in the active camera view window 502. As shown, the camera view 514b is a forward/side view showing the left-front fender of the vehicle 100. Thus, the camera view 514b is positioned to the left relative to the previously active camera view 514a. In the illustrative embodiment, the camera view 514b may be generated from image data received from multiple cameras 104, such as from the cameras 104a, 104b of FIG. 1. Illustratively, the vehicle 100 visible in the camera view 514b may be generated from a three-dimensional model of the vehicle 100 or otherwise generated by the computing device 102.

In use, the user may input a touch gesture 702 on the display 230, which is illustratively a "down" swipe. As shown, to generate the "down" swipe gesture 702, the user's finger initially touches toward the bottom of the display 230 and is drawn upward toward the top of the display 230. Similar to the gesture 602, the computing device 102 interprets this gesture 702 as a "down" swipe. Of course, it should be understood that in other embodiments the sense of the gesture 702 (e.g., which direction is considered "up" or "down") may be reversed or otherwise determined according to one or more user input conventions associated with the computing device 102. After receiving and interpreting the "down" swipe 702, the computing device 102 may update the external camera view interface as shown in diagram 800 of FIG. 8.

As shown in FIG. 8, after interpreting the "down" swipe, the active camera loop 506d is now the active camera loop. The camera loop 506d is an under-vehicle camera view and thus has a lower vertical viewing angle or altitude level compared to the previously active camera loop 506c. As shown, the camera loops control 510 has been updated to show two camera views 514a, 514b that are available in the under-vehicle camera loop 506d. Thus, the camera loop 506d has a different number of available camera views 514 as compared to the previously active camera loop 506c. Accordingly, an active camera view may be selected that has a viewing angle relative to the vehicle 100 that corresponds to the previously active camera view. Thus, in the illustrative embodiment, the camera view 514a is the active camera view and is displayed in the active camera view window 502. As shown, the camera view 514a is a forward view showing the underside of the vehicle 100. Additionally or alternatively, in some embodiments the computing device 102 may use a different technique for selecting the active camera view, such as recalling a previously active camera view for the active camera loop, selecting a default camera view for the active camera loop, or other technique. After displaying the camera view 514a in the active camera loop 506d, the user may continue performing touch interactions with the display 230 to select different camera views and/or to select different camera loops.

The following numbered clauses include embodiments that are contemplated and non-limiting:

Clause 1. A computing device for human machine interaction, the computing device comprising
an external view manager to (i) receive image data from one or more camera devices coupled to a vehicle and (ii) provide a plurality of camera loops, wherein each camera loop is associated with a plurality of camera views arranged in a circular ordering, wherein each camera view is based on the image data, and wherein each camera loop is further associated with a vertical viewing angle relative to the vehicle; and
a display manager to display an active camera view based an active camera view selection, wherein the active camera view selection is indicative of an active camera loop of the plurality of camera loops and the active camera view, wherein the active camera view is selected from the plurality of camera views associated with the active camera loop.

Clause 2. The computing device of clause 1, any other clause, or combination of clauses, further comprising
a user interface manager to receive a gestural input from a user of the computing device; and
an external view controller to update the active camera view selection based on the gestural input, wherein to update the active camera view selection comprises to select the active camera loop from the plurality of camera loops or to select the active camera view from the plurality of camera views associated with the active camera loop.

Clause 3. The computing device of clause 2, any other clause, or combination of clauses, wherein to receive the gestural input comprises to receive touch input from a touch screen of the computing device.

Clause 4. The computing device of clause 2, any other clause, or combination of clauses, wherein to receive the gestural input comprises to receive gesture tracking input from a sensor of the computing device.

Clause 5. The computing device of clause 2, any other clause, or combination of clauses, wherein to update the active camera view selection based on the gestural input comprises to:
determine whether a selected direction of the gestural input comprises a vertical direction or a horizontal direction;
select the active camera view from the plurality of camera views associated with the active camera loop in response to a determination that the selected direction of the gestural input comprises the horizontal direction; and
select the active camera loop from the plurality of camera loops in response to a determination that the selected direction of the gestural input comprises the vertical direction.

Clause 6. The computing device of clause 2, any other clause, or combination of clauses, wherein to select the active camera view from the plurality of camera views associated with the active camera loop comprises to select a camera view adjacent to the active camera view in the circular ordering of the plurality of camera views.

Clause 7. The computing device of clause 6, any other clause, or combination of clauses, wherein to select the camera view adjacent to the active camera view comprises to determine a horizontal direction of the gestural input and select the camera view adjacent to the active camera view in the horizontal direction of the gestural input relative to the vehicle.

Clause 8. The computing device of clause 2, any other clause, or combination of clauses, wherein to select the active camera loop from the plurality of camera loops comprises to select a camera loop adjacent to the active camera loop, wherein the plurality of camera loops are ordered by vertical viewing angle relative to the vehicle.

Clause 9. The computing device of clause 8, wherein to select the camera loop adjacent to the active camera loop comprises to determine a vertical direction of the gestural input and select the camera loop adjacent to the active camera loop in the vertical direction of the gestural input relative to the vehicle.

Clause 10. The computing device of clause 1, any other clause, or combination of clauses, wherein the display manager is further to display an indication of the active camera view that is indicative of a view angle of the active camera view relative to the vehicle.

Clause 11. The computing device of clause 10, any other clause, or combination of clauses, wherein the indication of the active camera view comprises a plurality of icons, wherein each icon is associated with a camera view of the plurality of camera views associated with the active camera loop, and wherein each of the plurality of icons has a position indicative of a view angle of the associated camera view relative to the vehicle.

Clause 12. The computing device of clause 10, any other clause, or combination of clauses, wherein the display manager is further to display an indication of the active camera loop within a list of the plurality of camera loops.

The invention claimed is:

1. A computing device for human machine interaction, the computing device comprising:
- an external view manager to (i) receive image data from one or more camera devices coupled to a vehicle and (ii) provide a plurality of camera loops, wherein each camera loop is associated with a plurality of camera views arranged in a circular ordering, wherein each camera view is based on the image data, and wherein each camera loop is further associated with a vertical viewing angle relative to the vehicle;
- a display manager to display an active camera view based an active camera view selection, wherein the active camera view selection is indicative of an active camera loop of the plurality of camera loops and the active camera view, wherein the active camera view is selected from the plurality of camera views associated with the active camera loop;
- a user interface manager to receive a gestural input from a user of the computing device; and
- an external view controller to update the active camera view selection based on the gestural input, wherein to update the active camera view selection comprises to: (i) determine whether a selected direction of the gestural input comprises a vertical direction or a horizontal direction, (ii) select the active camera loop from the plurality of camera loops in response to a determination that the selected direction of the gestural input comprises the vertical direction, and (iii) select the active camera view from the plurality of camera views associated with the active camera loop in response to a determination that the selected direction of the gestural input comprises the horizontal direction.

2. The computing device of claim 1, wherein to receive the gestural input comprises to receive touch input from a touch screen of the computing device.

3. The computing device of claim 1, wherein to receive the gestural input comprises to receive gesture tracking input from a sensor of the computing device.

4. The computing device of claim 1, wherein to select the active camera view from the plurality of camera views associated with the active camera loop comprises to select a camera view adjacent to the active camera view in the circular ordering of the plurality of camera views.

5. The computing device of claim 4, wherein to select the camera view adjacent to the active camera view comprises to determine a horizontal direction of the gestural input and select the camera view adjacent to the active camera view in the horizontal direction of the gestural input relative to the vehicle.

6. The computing device of claim 1, wherein to select the active camera loop from the plurality of camera loops comprises to select a camera loop adjacent to the active camera loop, wherein the plurality of camera loops are ordered by vertical viewing angle relative to the vehicle.

7. The computing device of claim 6, wherein to select the camera loop adjacent to the active camera loop comprises to determine a vertical direction of the gestural input and select the camera loop adjacent to the active camera loop in the vertical direction of the gestural input relative to the vehicle.

8. The computing device of claim 1, wherein the display manager is further to display an indication of the active camera view that is indicative of a view angle of the active camera view relative to the vehicle.

9. The computing device of claim 8, wherein the indication of the active camera view comprises a plurality of icons, wherein each icon is associated with a camera view of the plurality of camera views associated with the active camera loop, and wherein each of the plurality of icons has a position indicative of a view angle of the associated camera view relative to the vehicle.

10. The computing device of claim 8, wherein the display manager is further to display an indication of the active camera loop within a list of the plurality of camera loops.

11. A computing device for human machine interaction, the computing device comprising:
- an external view manager to (i) receive image data from one or more camera devices coupled to a vehicle and (ii) provide a plurality of camera loops, wherein each camera loop is associated with a plurality of camera views arranged in a circular ordering, wherein each camera view is based on the image data, and wherein each camera loop is further associated with a vertical viewing angle relative to the vehicle;
- a display manager to display an active camera view based an active camera view selection, wherein the active camera view selection is indicative of an active camera loop of the plurality of camera loops and the active camera view, wherein the active camera view is selected from the plurality of camera views associated with the active camera loop;
- a user interface manager to receive a gestural input from a user of the computing device; and
- an external view controller to update the active camera view selection based on the gestural input, wherein to update the active camera view selection comprises to select the active camera loop from the plurality of camera loops or to select the active camera view from the plurality of camera views associated with the active camera loop;
- wherein to select the active camera loop from the plurality of camera loops comprises to select a camera loop adjacent to the active camera loop, wherein the plurality of camera loops are ordered by vertical viewing angle relative to the vehicle.

* * * * *